United States Patent
Tseng et al.

(10) Patent No.: US 8,334,940 B2
(45) Date of Patent: Dec. 18, 2012

(54) DISPLAY PANEL

(75) Inventors: Wen-Hsien Tseng, Taichung (TW); Yen-Heng Huang, Taipei County (TW); Chia-Hui Pai, Taichung (TW); Chung-Kai Chen, Taichung County (TW); Wei-Yuan Cheng, Taichung (TW); Chin-An Tseng, Taipei (TW); Chia-Yu Lee, Taipei County (TW); Ting-Yi Cho, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 563 days.

(21) Appl. No.: 12/693,456

(22) Filed: Jan. 26, 2010

(65) Prior Publication Data
US 2011/0128280 A1   Jun. 2, 2011

(30) Foreign Application Priority Data
Dec. 1, 2009  (TW) ................................ 98141020 A

(51) Int. Cl.
*G02F 1/136* (2006.01)
(52) U.S. Cl. .......................... 349/48; 349/110
(58) Field of Classification Search .................... 349/48, 349/110
See application file for complete search history.

(56) References Cited

U.S. PATENT DOCUMENTS

| | | | |
|---|---|---|---|
| 6,266,117 B1 | 7/2001 | Yanagawa et al. | |
| 6,693,697 B2 | 2/2004 | Sakamoto et al. | |
| 7,202,924 B1 | 4/2007 | Park et al. | |
| 7,336,248 B2 | 2/2008 | Lin et al. | |
| 2005/0174503 A1 | 8/2005 | Kim et al. | |
| 2007/0242009 A1 | 10/2007 | Su | |
| 2008/0239224 A1 | 10/2008 | Hori | |
| 2009/0225017 A1 | 9/2009 | Kim et al. | |

OTHER PUBLICATIONS

"Search Report of European counterpart application", issued on Oct. 7, 2010, p. 1-p. 10, in which the listed references were cited.

*Primary Examiner* — Phu Vu
(74) *Attorney, Agent, or Firm* — Jianq Chyun IP Office

(57) ABSTRACT

A display panel including a first substrate, scan lines, data lines, sub-pixel units, a light-shielding layer, a second substrate, and a display medium is provided. Each of the sub-pixel units includes a main display unit and a sub-display unit. The main display unit includes a first switch and a first pixel electrode, wherein the first pixel electrode and the data lines adjacent thereto are separated from each other with a gap (G1). The sub-display unit includes a second switch and a second pixel electrode, wherein the second and the data lines adjacent thereto are overlapped with a first overlapping width (W1). The light-shielding layer is disposed between two adjacent first pixel electrodes such that the light-shielding layer and one of the first pixel electrodes adjacent thereto are overlapped with a second overlapping width (W2). Additionally, the display medium is display between the first substrate and the second substrate.

28 Claims, 10 Drawing Sheets

DISPLAY PANEL

CROSS-REFERENCE TO RELATED APPLICATION

This application claims the priority benefit of Taiwan application serial no. 98141020, filed Dec. 1, 2009. The entirety of the above-mentioned patent application is hereby incorporated by reference herein and made a part of specification.

BACKGROUND OF THE INVENTION

1. Field of the Invention

The present invention relates to a display panel, and particularly relates to design of a light-shielding layer in a display panel.

2. Description of Related Art

With great advance in techniques of manufacturing optoelectronics and semiconductor devices, flat panel displays have been vigorously developed. Among the flat panel displays, liquid crystal display (LCD) panels characterized by low operating voltage, free of harmful radiation, light weight and small and compact size gradually replace conventional CRT displays and have become mainstream displays. At this current stage, the LCD panels are developed towards full-colors, large sizes, high resolution and low costs. In order to achieve dull-color displaying, color filters are used in LCD panels. Currently, color filter substrates, color filter on array (COA) technology and array on color filter (AOC) technology are commonly used in fabrication. Take the COA technology as an example, since color filters are directly fabricated over thin film transistor array (TFT array), mis-alignment between the color filters and the TFT array can be minimized. Accordingly, the COA technology has been widely used in products.

FIG. 1 is a schematic cross-sectional view of a conventional LCD panel. Referring to FIG. 1, the conventional LCD panel 100 includes a TFT array substrate 110, a color filter layer 120 formed on the TFT array substrate 110, an opposite substrate 130 disposed above the TFT array substrate 110, and a liquid crystal layer 140 disposed between the TFT array substrate 110 and the opposite substrate 130. As shown in FIG. 1, the TFT array substrate 110 has a plurality of pixel electrodes 112 and the opposite substrate 130 has a black matrix 132. Area between the pixel electrodes 112 and edge of each pixel electrode 112 is shielded by the black matrix 132. Accordingly, light leakage occurred between the pixel electrodes 112 can be avoided. Since the black matrix 132 has taper X located above the pixel electrode 112, liquid crystal disclination resulted from the taper X may occurred and accordingly light leakage may occurred at edge of the black matrix 132. It is noted that in order to prevent color washout of LCD panels, each sub-pixel of the TFT array substrate 110 includes a main display unit and a sub-display unit, wherein display quality of the sub-display unit is significantly affected by light leakage resulted from the black matrix 132. Accordingly, how to avoid light leakage which is occurred at edge of the sub-display unit and resulted from the black matrix 132 is an important issue.

SUMMARY OF THE INVENTION

The present application provides a display panel capable of avoiding light leakage resulted from black matrix formed therein.

The present application provides a display panel, including a first substrate, a plurality of scan lines, a plurality of data lines, a plurality of sub-pixel units, a light-shielding layer, a second substrate, and a display medium. The scan lines and the data lines are disposed on the first substrate. Each of the sub-pixel units includes a main display unit and a sub-display unit. The main display unit includes a first switch and a first pixel electrode, wherein the first pixel electrode and the data lines adjacent thereto are separated from each other with a gap (G1). The sub-display unit includes a second switch and a second pixel electrode, wherein the second and the data lines adjacent thereto are overlapped with a first overlapping width (W1). The light-shielding layer is disposed between two adjacent first pixel electrodes such that the light-shielding layer and one of the first pixel electrodes adjacent thereto are overlapped with a second overlapping width (W2). In addition, the second substrate is disposed opposite to the first substrate, and the display medium is disposed between the first substrate and the second substrate.

In an embodiment of the present application, the first switch and the second switch in each of the sub-pixel units are electrically connected with the same scan line and the same data line.

In an embodiment of the present application, the light-shielding layer and the second pixel electrodes adjacent thereto are not overlapped.

In an embodiment of the present invention, 0 micrometer<gap (G1)≦5 micrometers, 0 micrometer<first overlapping width (W1)≦5 micrometers, and 0 micrometer<second overlapping width (W2)≦6 micrometers. In an embodiment of the present application, each of the data lines includes a first portion and a second portion. The first portion is located between two adjacent first pixel electrodes and has a first line width. The second portion is located between two adjacent second pixel electrodes and has a second line width, wherein the first line width is smaller than the second line width.

In an embodiment of the present application, the first line width is approximately 4 micrometers to 10 micrometers, and the second line width is approximately 10 micrometers to 20 micrometers.

In an embodiment of the present application, the light-shielding layer is located between the first substrate and the display medium.

In an embodiment of the present application, the light-shielding layer is located between the second substrate and the display medium.

In an embodiment of the present application, the display panel further includes a color filter layer, wherein the color filter layer is located between the first substrate and the display medium.

In an embodiment of the present application, the first switch and the second switch in each of the sub-pixel units are electrically connected with the same scan line and different data lines.

In an embodiment of the present application, the light-shielding layer and one of the second pixel electrodes adjacent thereto are overlapped with a third overlapping width (W3).

In an embodiment of the present application, the light-shielding layer is located between the first substrate and the display medium.

In an embodiment of the present application, the light-shielding layer is located between the second substrate and the display medium.

In an embodiment of the present application, the display panel further includes a color filter layer, wherein the color filter layer is located between the first substrate and the display medium.

The present application provides a display panel including a plurality of sub-pixels, a color filter layer, and a light-shielding layer. Each of the sub-pixels is electrically connected with a scan line and a data line. Each of the sub-pixels includes a main display unit and a sub-display unit. The main display unit includes a first switch and a first pixel electrode. The first switch is electrically connected with the scan line and the data line, the first pixel electrode is electrically connected with the first switch, and the first pixel electrode and the data line adjacent thereto are not overlapped. The sub-display unit includes a second switch and a second pixel electrode. The second switch is electrically connected with the scan line and the data line, the second pixel electrode is electrically connected with the second switch, and the second pixel electrode and the data line adjacent thereto are overlapped. The color filter layer covers the scan line, the data line, the first switch, and the second switch. The light-shielding layer is located above parts area of the scan line and parts area of the data line, wherein the light-shielding layer is disposed between two adjacent first pixel electrodes and overlapped with one of the first pixel electrodes adjacent thereto. The light-shielding layer is not disposed between two adjacent second pixel electrodes.

The present application also provides a display panel including a plurality of sub-pixels substrate, a color filter layer, and a light-shielding layer. Each of the sub-pixels is electrically connected with a scan line and a data line. Each of the sub-pixels includes a main display unit and a sub-display unit. The main display unit includes a first switch and a first pixel electrode. The first switch is electrically connected with the scan line and the data line, the first pixel electrode is electrically connected with the first switch, and the first pixel electrode and the data line adjacent thereto are not overlapped. The sub-display unit includes a second switch and a second pixel electrode. The second switch is electrically connected with the scan line and the data line, the second pixel electrode is electrically connected with the second switch, and the second pixel electrode and the data line adjacent thereto are overlapped. The color filter layer covers the scan line, the data line, the first switch, and the second switch. The light-shielding layer is located above parts area of the scan line and parts area of the data line, wherein the light-shielding layer is disposed between two adjacent first pixel electrodes and two adjacent second pixel electrodes. The light-shielding layer is overlapped with one of the first pixel electrodes adjacent thereto. In an area between two adjacent second pixel electrodes, a width of the light-shielding layer is smaller than a line width of the data line.

In an embodiment of the present application, the data line includes a first portion and a second portion. The first portion is located between two adjacent first pixel electrodes and has a first line width. The second portion is located between two adjacent second pixel electrodes and has a second line width, wherein the first line width is smaller than the second line width.

In an embodiment of the present application, the first line width is approximately 4 micrometers to 10 micrometers, and the second line width is approximately 10 micrometers to 20 micrometers.

In an embodiment of the present application, the light-shielding layer is in contact with the color filter layer directly.

In an embodiment of the present application, the light-shielding layer is in contact with the color filter layer indirectly. In an embodiment of the present application, the color filter layer is disposed under the first pixel electrode and the second electrode.

The present application further provides a display panel including a plurality of sub-pixels substrate, a color filter layer, and a light-shielding layer. Each of the sub-pixels is electrically connected with a scan line, a first data line, and a second data line. Each of the sub-pixels includes a main display unit and a sub-display unit. The main display unit includes a first switch and a first pixel electrode. The first switch is electrically connected with the scan line and the first data line, the first pixel electrode is electrically connected with the first switch, and the first pixel electrode is not overlapped with the first data line and the second data line. The sub-display unit includes a second switch and a second pixel electrode. The second pixel electrode is electrically connected with the second switch. The second pixel electrode is overlapped with the first data line and the second data line. The color filter layer is disposed under the first pixel electrode and the second pixel electrode and covers the scan line, the first data line, the second data line, the first switch, and the second switch. The light-shielding layer is located above parts area of the scan line, parts area of the first data line, and parts area of the second data line, wherein the light-shielding layer is disposed between two adjacent first pixel electrodes and two adjacent second pixel electrodes. The light-shielding layer is overlapped with one of the first pixel electrodes adjacent thereto. In an area between two adjacent second pixel electrodes, a gap is formed between the first data line and the second data line. In addition, sum of the gap, a line width of the first data line and a line width of the second data line is greater than a width of the light-shielding layer.

In an embodiment of the present application, the second switch is electrically connected with the scan line and the second data line.

The present application further provides a display panel including a plurality of sub-pixels substrate and a light-shielding layer. Each of the sub-pixels is electrically connected with a scan line and a data line. Each of the sub-pixels includes a main display unit and a sub-display unit. The main display unit includes a first switch and a first pixel electrode. The first switch is electrically connected with the scan line and the data line, while the first pixel electrode is electrically connected with the first switch. The sub-display unit includes a second switch and a second pixel electrode. The second switch is electrically connected with the scan line and the data line, while the second pixel electrode is electrically connected with the second switch. Furthermore, the light-shielding layer substantially surrounds the main display unit but does not surround the sub-display unit.

In an embodiment of the present application, the display panel further includes a color filter layer, wherein the color filter layer substantially covers the scan line, the data line, the first switch, and the second switch.

In an embodiment of the present application, the color filter layer is disposed under the first pixel electrode and the second electrode.

Since light leakage may occurred at edge of the sub-display unit can be avoided by the design of the black matrix of the present application, the display panel of the present application has favorable display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
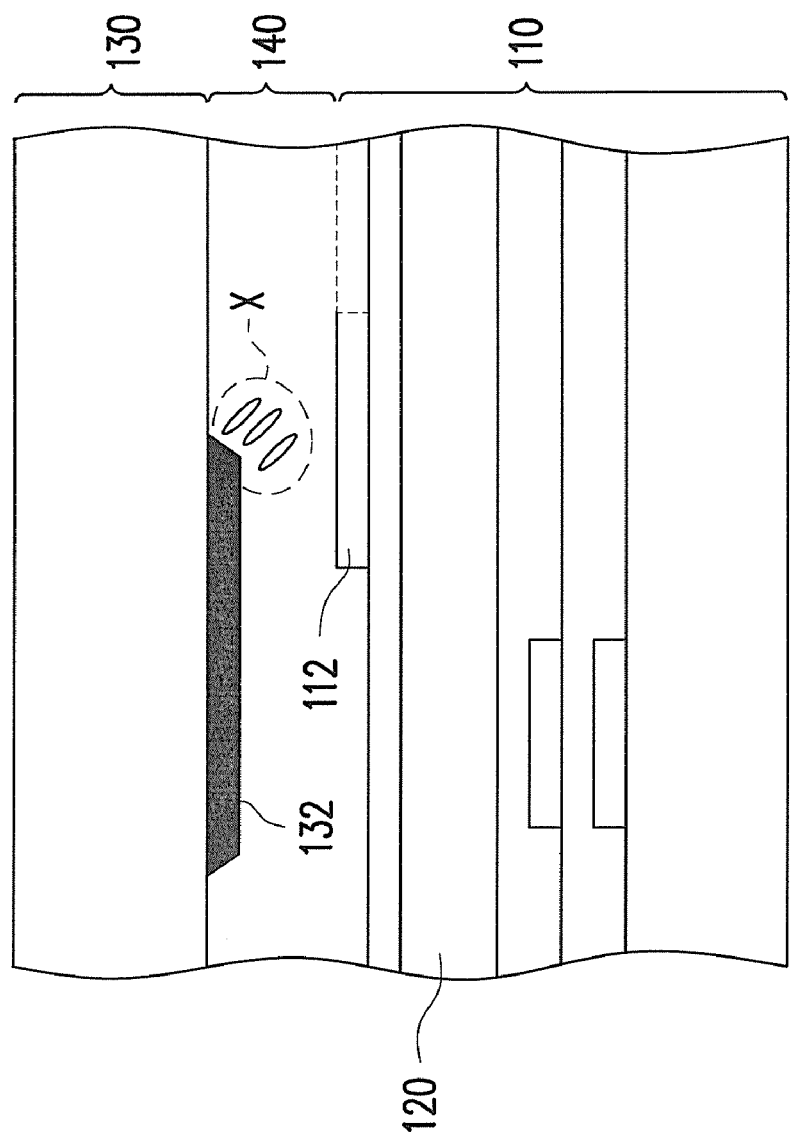
FIG. 1 is a schematic cross-sectional view of a conventional LCD panel.
Figure 2:
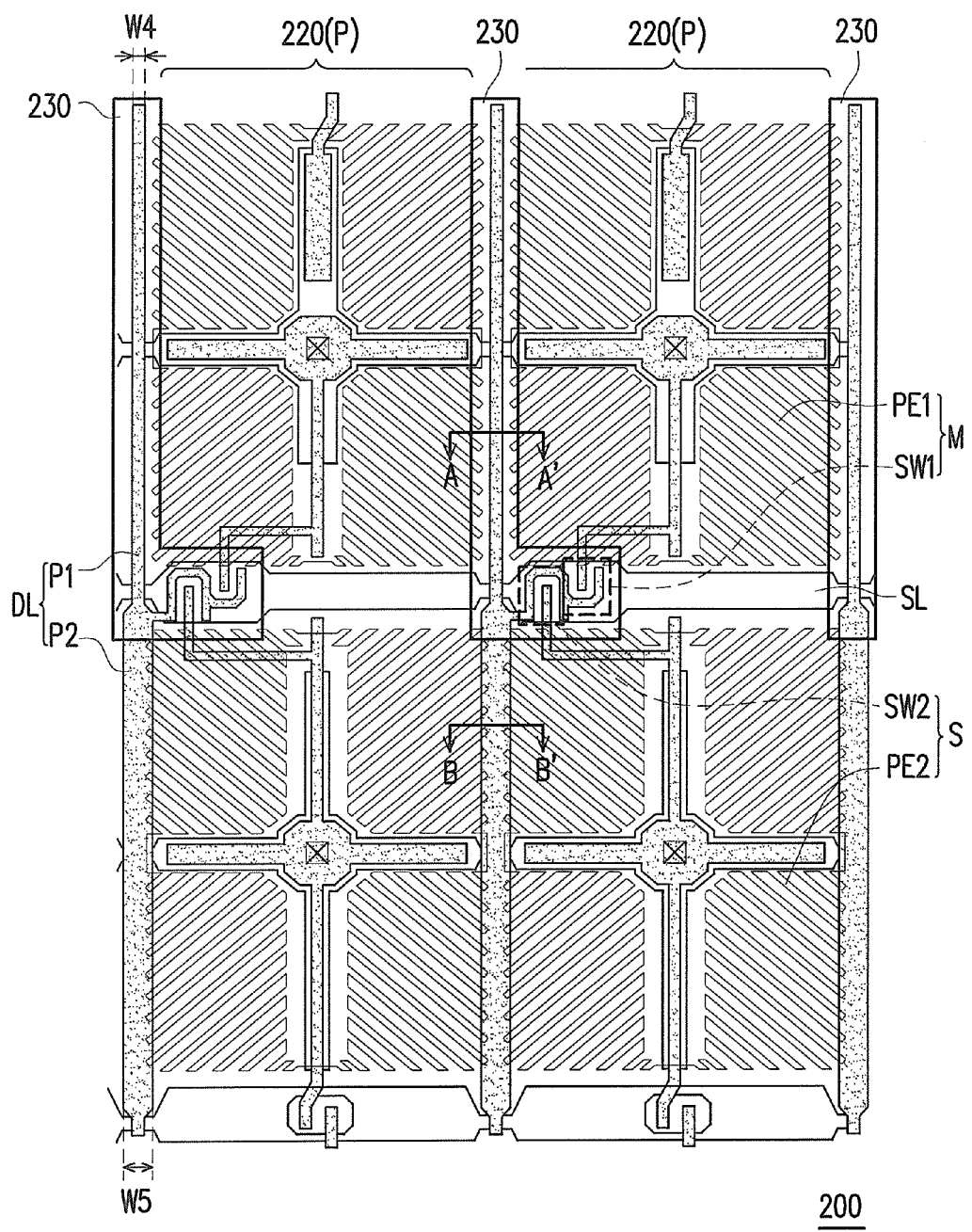
FIG. 2 is a schematic top view of a display panel according to the first embodiment of the present application.
Figure 3:
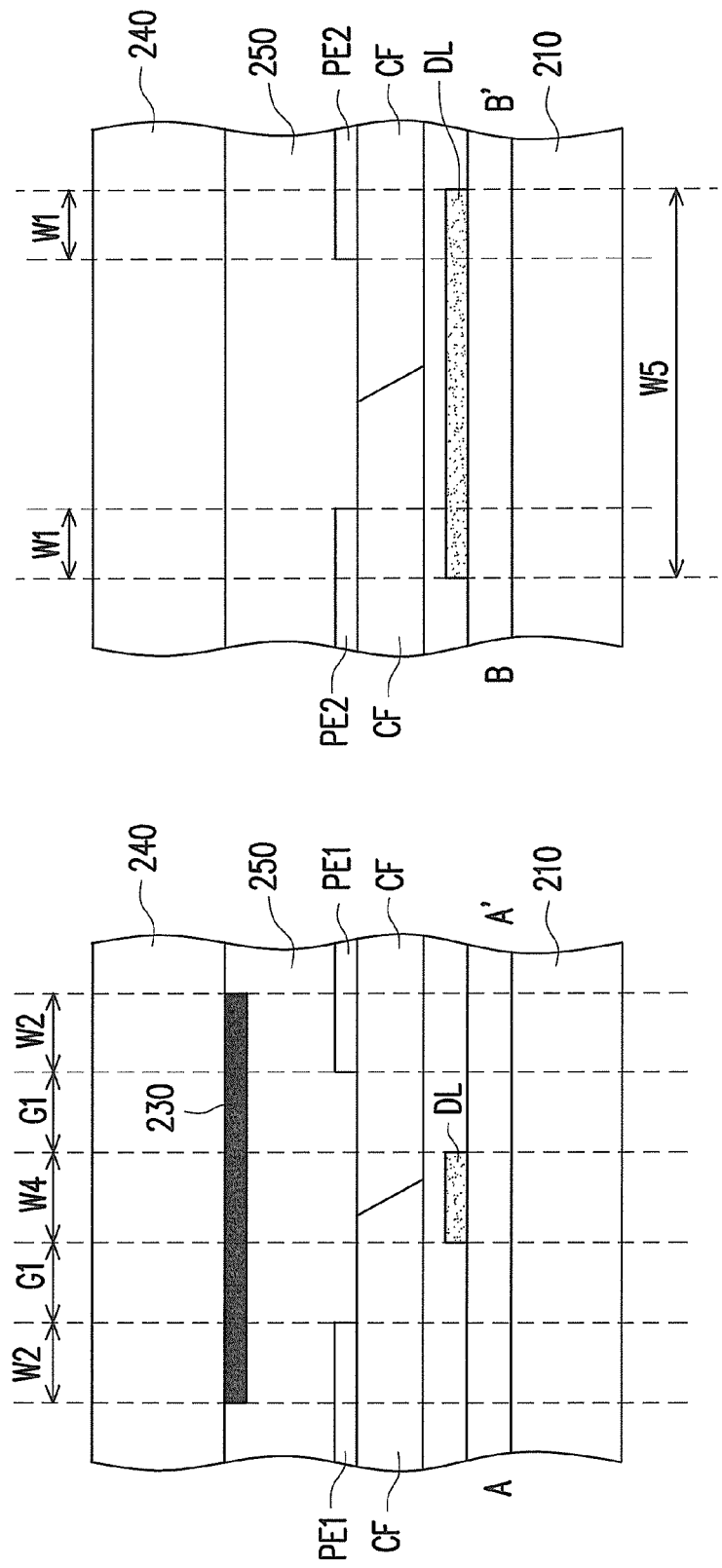
FIG. 3 is a cross-sectional view along line A-A' and line B-B' in FIG. 2.

FIG. 2 is a schematic top view of a display panel according to the first embodiment of the present application. FIG. 3 is a cross-sectional view along line A-A' and line B-B' in FIG. 2. Referring to FIG. 2 and FIG. 3, the display panel 200 of the present embodiment includes a first substrate 210, a plurality of scan lines SL, a plurality of data lines DL, a plurality of sub-pixel units 220, a light-shielding layer 230, a second substrate 240, and a display medium 250. The scan lines SL and the data lines DL are disposed on the first substrate 210, and the sub-pixel units 220 are also disposed on the first substrate 210. Here, a sub-pixel P is defined to include the sub-pixel units 220 disposed on the first substrate 210, the display medium 250 (e.g. liquid crystal layer) located above the sub-pixel units 220, and a common electrode (not shown) disposed on the second substrate 240. In addition, the second substrate 240 is disposed opposite to the first substrate 210, and the display medium 250 is disposed between the first substrate 210 and the second substrate 240.

In the present embodiment, each of the sub-pixels P is electrically connected with one of the scan lines SL and one of the data lines DL correspondingly. Each of the sub-pixels P includes a main display unit M and a sub-display unit S. The main display unit M includes a first switch SW1 and a first pixel electrode PE1. The first switch SW1 is electrically connected with the corresponding scan line SL and the data line DL, the first pixel electrode PE1 is electrically connected with the first switch SW1, and the first pixel electrode PE1 and the data line DL adjacent thereto are not overlapped. It is noted that the first pixel electrode PE1 and one of the data lines DL adjacent thereto are separated from each other with a gap (G1). In the present embodiment, a gap (G1) is between the first pixel electrode PE1 and one of the data lines DL adjacent thereto, and the gap (G1) is covered by the light-shielding layer 230. For instance, 0 micrometer<gap (G1)≦5 micrometers. Preferably, the gap (G1) between the first pixel electrode PE1 and one of the data lines DL adjacent thereto is about 3 micrometers, for example.

The sub-display unit S includes a second switch SW2 and a second pixel electrode PE2. The second switch SW2 is electrically connected with one of the scan lines SL and one of the data lines DL correspondingly. The second pixel electrode PE2 is electrically connected with the second switch SW2. In addition, the second pixel electrode PE2 and the data lines DL adjacent thereto are overlapped. Specifically, the second pixel electrode PE2 and the data lines DL adjacent thereto are overlapped with a first overlapping width (W1). In the present embodiment, 0 micrometer<first overlapping width (W1)≦5 micrometers, and preferably, the first overlapping width (W1) is about 4 micrometers. Here, the first switch SW1 and the second switch SW2 in each of the sub-pixel units 220 are electrically connected with the same scan line SL and the same data line DL (so-called 1D1G design).

The light-shielding layer 230 is disposed between two adjacent first pixel electrodes PE1 such that the light-shielding layer 230 and one of the first pixel electrodes PE1 adjacent thereto are overlapped with a second overlapping width (W2). In the present embodiment, 0 micrometer<second overlapping width (W2)≦6 micrometers, and preferably, the second overlapping width (W2) is about 5 micrometers. In the present embodiment, the light-shielding layer 230 is a black matrix (B/M), for example.

As shown in FIG. 2 and FIG. 3, the light-shielding layer 230 is merely distributed over parts area of the scan lines SL and parts area of the data lines DL. Furthermore, the light-shielding layer 230 is not disposed between any two adjacent second pixel electrodes PE2. In other words, the light-shielding layer 230 substantially surrounds the main display unit M but does not surround the sub-display unit S. Since the light-shielding layer 230 is not disposed between any two adjacent second pixel electrodes PE2, light leakage resulted from the black matrix 230 is improved. Accordingly, display quality of the sub-display unit S is enhanced.

In an embodiment of the present application, the display panel 200 further includes a color filter layer CF disposed on the first substrate 210. The color filter layer CF substantially covers the scan lines SL, the data lines DL, the first switch SW1, and the second switch SW2. In addition, as shown in FIG. 3, the color filter layer CF of the present embodiment is disposed under the first pixel electrode PE1 and the second electrode PE2.

As illustrated in FIG. 2, each of the data lines DL includes a first portion P1 and a second portion P2. The first portion P1 is located between two adjacent first pixel electrodes PE1 and has a first line width W4. The second portion P2 is located between two adjacent second pixel electrodes PE2 and has a second line width W5, wherein the first line width W4 is smaller than the second line width W5. For example, the first line width W4 is approximately 4 micrometers to 10 micrometers, and the second line width W5 is approximately 10 micrometers to 20 micrometers. More preferably, the first line width W4 is about 6 micrometers, and the second line width W5 is about 16 micrometers. Furthermore, the first line width W4 of the first portion P1 is smaller than the distance between two adjacent first pixel electrodes PE1, while the second line width W5 of the first portion P2 is greater than the distance between two adjacent second pixel electrodes PE2.

In the present embodiment, the light-shielding layer 230 is fabricated over the color filter layer CF and is not in contact with the color filter layer CF directly. Specifically, the light-shielding layer 230 is located between the second substrate 240 and the display medium 250.

Figure 4:
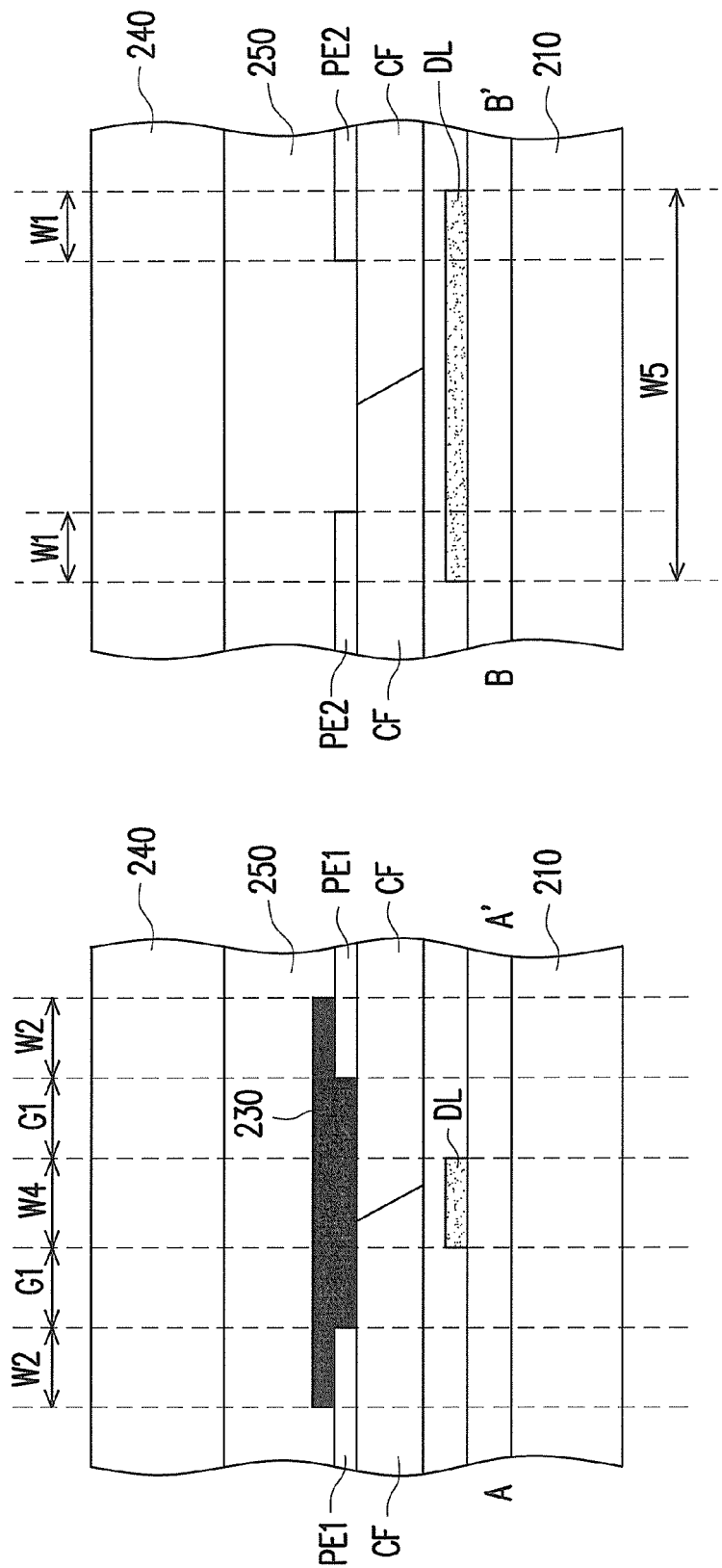
FIG. 4 is another cross-sectional view along line A-A' and line B-B' in FIG. 2.

FIG. 4 is another cross-sectional view along line A-A' and line B-B' in FIG. 2. Referring to FIG. 3 and FIG. 4, the cross-sectional view illustrated in FIG. 4 is similar with that illustrated in FIG. 3 except that the light-shielding layer 230 is fabricated on and directly in contact with the color filter layer CF (so-called Black matrix On Array design). Specifically, the light-shielding layer 230 is located between the first substrate 210 and the display medium 250.

Since the light-shielding layer 230 is not disposed between any two adjacent second pixel electrodes PE2, light leakage resulted from the black matrix 230 is improved. Accordingly, display quality of the sub-display unit S is enhanced.

Second Embodiment

Figure 5:
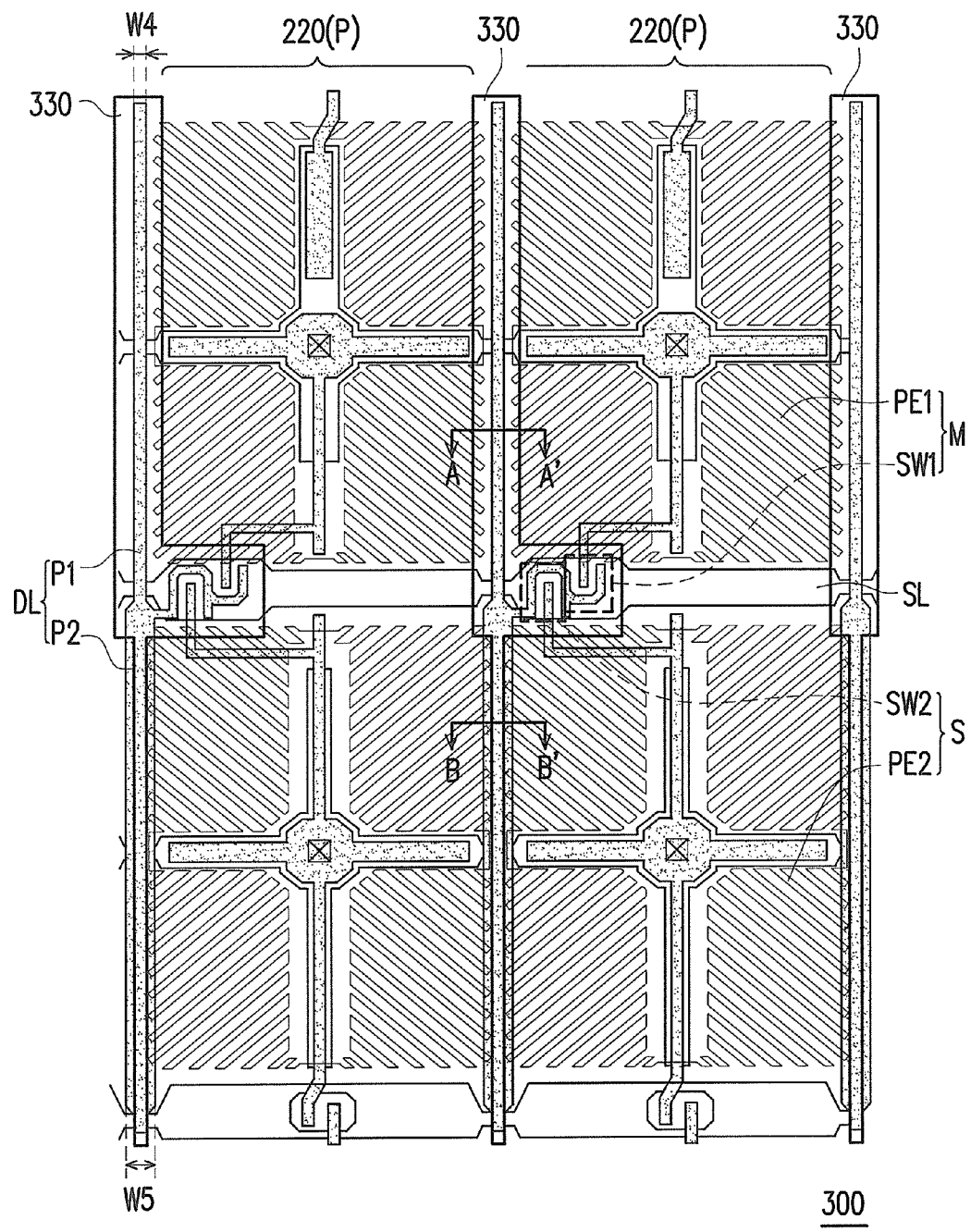
FIG. 5 is a schematic top view of a display panel according to the second embodiment of the present application.
Figure 6:
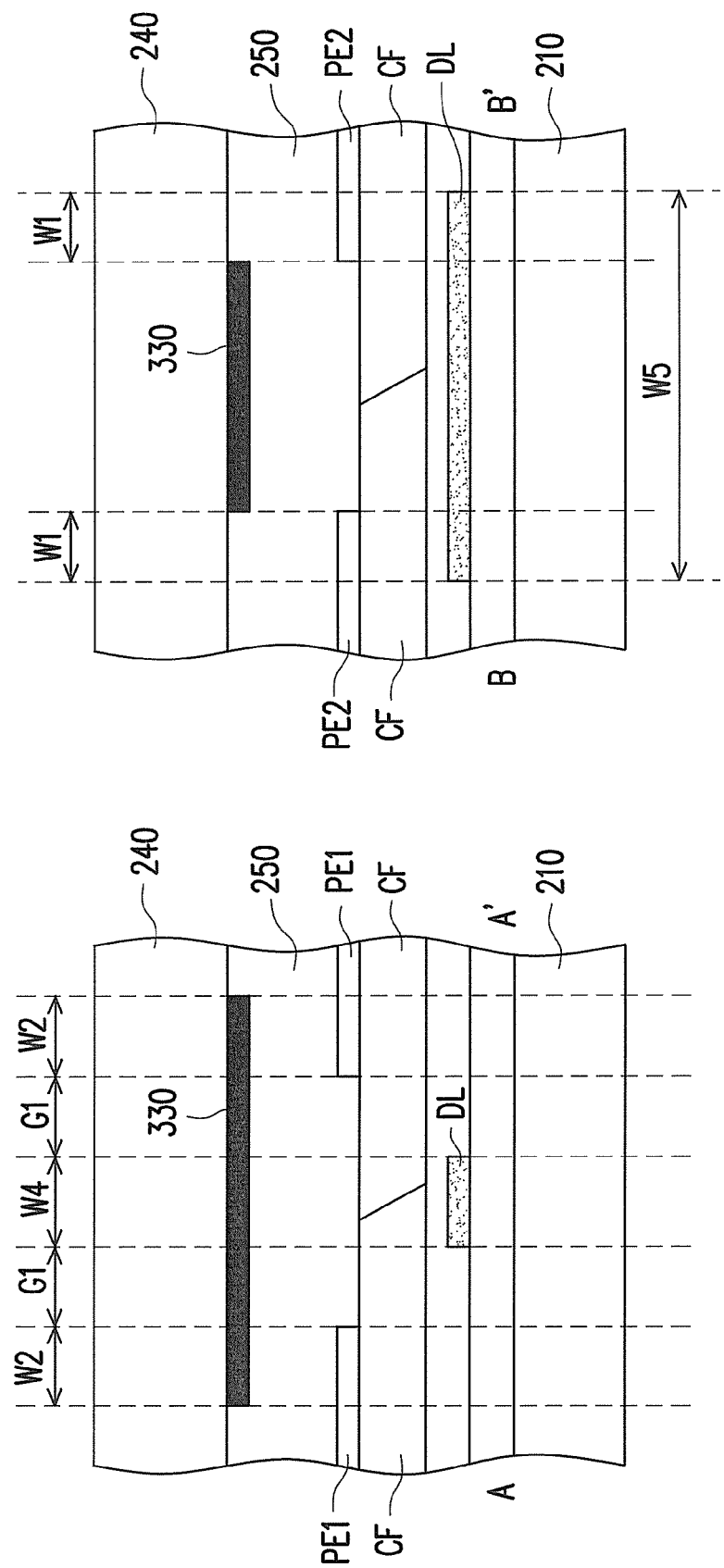
FIG. 6 is a cross-sectional view along line A-A' and line B-B' in FIG. 5.
Figure 7:
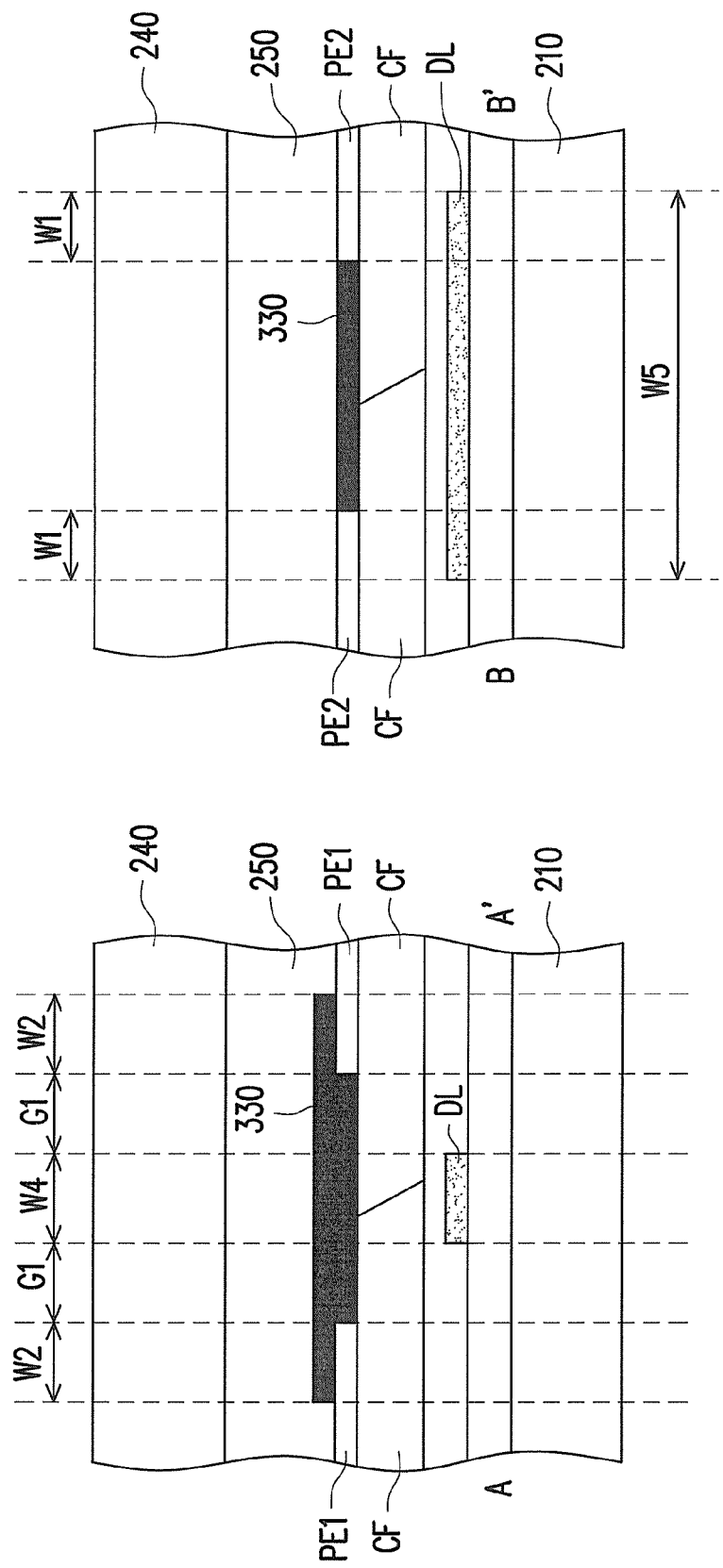
FIG. 7 is another cross-sectional view along line A-A' and line B-B' in FIG. 5.

FIG. 5 is a schematic top view of a display panel according to the second embodiment of the present application. FIG. 6 is a cross-sectional view along line A-A' and line B-B' in FIG. 5. FIG. 7 is another cross-sectional view along line A-A' and line B-B' in FIG. 5. Referring to FIG. 5 through FIG. 7, the display panel 300 of the present embodiment is similar with the display panel 200 except that the pattern of the light-shielding layer 330 is different from the pattern of the light-shielding layer 230. Specifically, the light-shielding layer 330 is disposed between two adjacent first pixel electrodes PE1 and two adjacent second pixel electrodes PE2. The light-shielding layer 330 is overlapped with one of the first pixel electrodes PE1 adjacent thereto. In the area between two adjacent second pixel electrodes PE2, the width of the light-shielding layer 330 is smaller than the line width W5 of second portion P2 of the data line DL.

Referring to FIG. 6 and FIG. 7, in the area between two adjacent second pixel electrodes PE2, the width of the light-shielding layer 330 is substantially equal to or smaller than the distance between two second pixel electrodes PE2 adjacent thereto. Since the width of the light-shielding layer 330 is substantially equal to or smaller than the distance between two second pixel electrodes PE2 adjacent thereto, light leakage resulted from the black matrix 330 is improved. Accordingly, display quality of the sub-display unit S is enhanced also.

Third Embodiment

Figure 8:
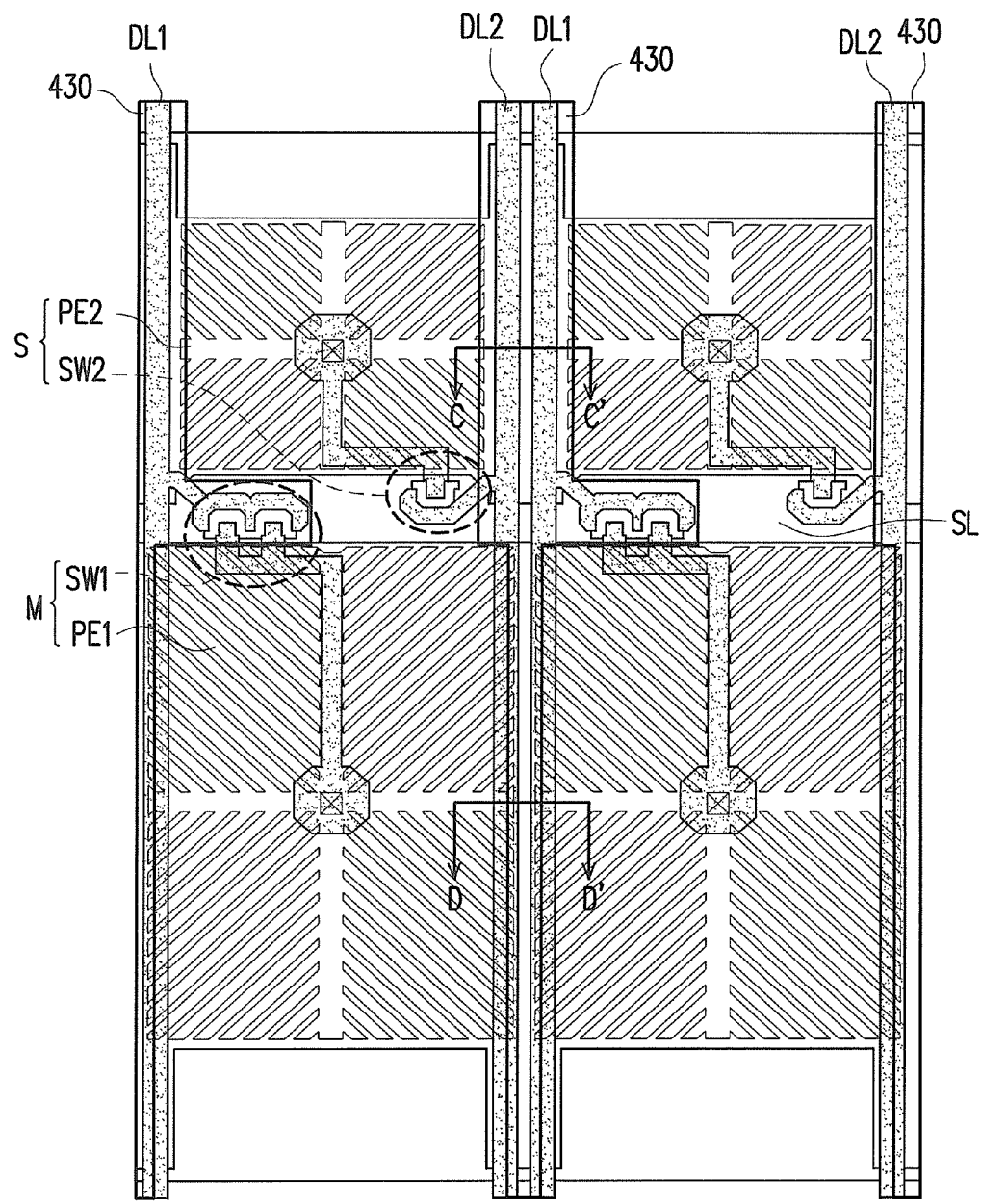
FIG. 8 is a schematic top view of a display panel according to the third embodiment of the present application.
Figure 9:
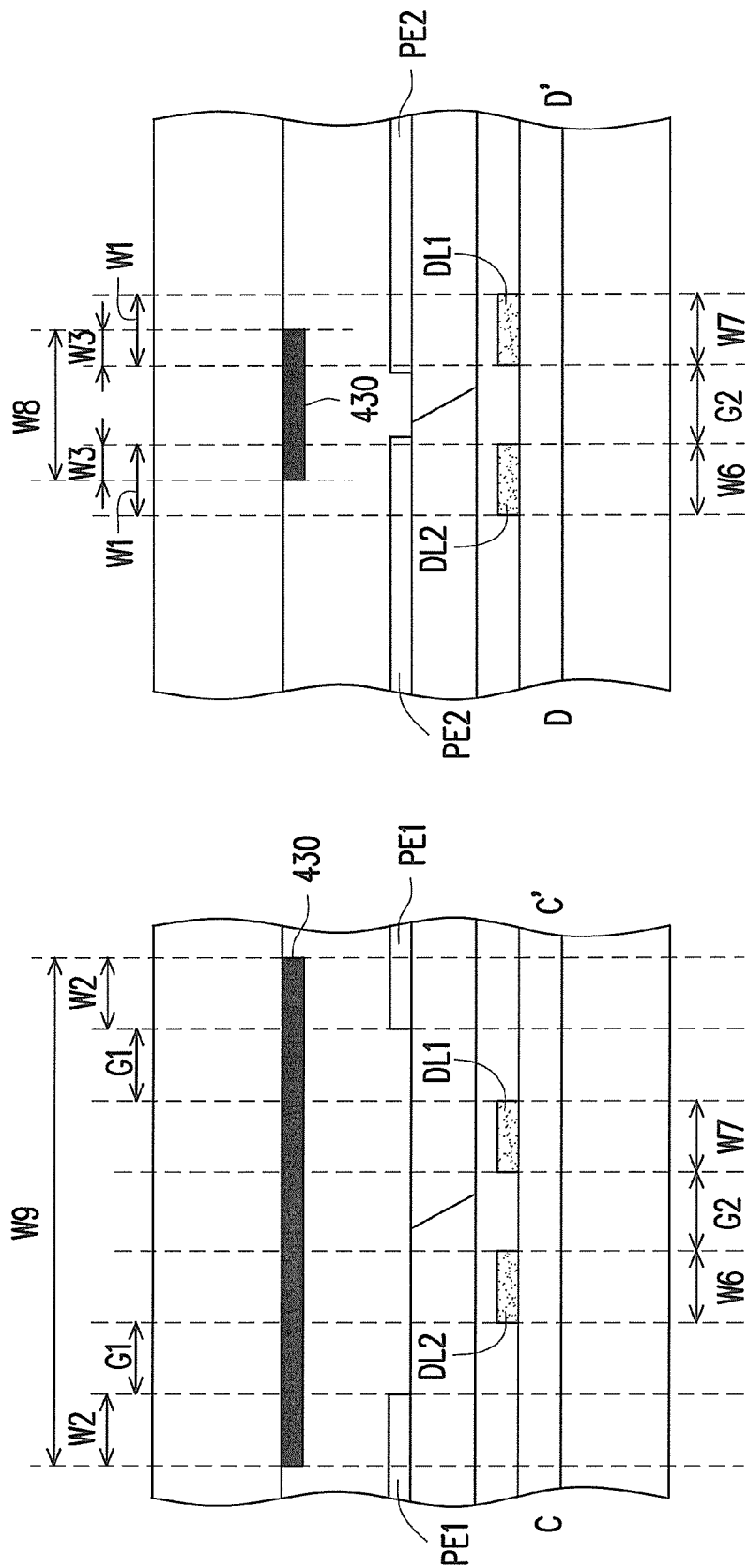
FIG. 9 is a cross-sectional view along line C-C' and line D-D' in FIG. 8.

FIG. 8 is a schematic top view of a display panel according to the third embodiment of the present application. FIG. 9 is a cross-sectional view along line C-C' and line D-D' in FIG. 8. FIG. 9 is another cross-sectional view along line C-C' and line D-D' in FIG. 8. Referring to FIG. 8 and FIG. 9, the display panel 400 of the present embodiment includes a plurality of sub-pixels P, a color filter layer CF, and a light-shielding layer 430. Each of the sub-pixels P is electrically connected with a scan line SL, a first data line DL1, and a second data line DL2, correspondingly. Each of the sub-pixels P includes a main display unit M and a sub-display unit S. The main display unit M includes a first switch SW1 and a first pixel electrode PE1. The first switch SW1 is electrically connected with the scan line SL and the first data line DL1, the first pixel electrode PE1 is electrically connected with the first switch SW1, and the first pixel electrode PE1 is not overlapped with the first data line DL1 and the second data line DL2. The sub-display unit S includes a second switch SW2 and a second pixel electrode PE2. The second pixel electrode PE2 is electrically connected with the second switch SW2. The second pixel electrode PE2 is overlapped with the first data line DL1 and the second data line DL2. The color filter layer CF is disposed under the first pixel electrode PE1 and the second pixel electrode PE2 and covers the scan line SL, the first data line DL1, the second data line DL2, the first switch SW1, and the second switch SW2. The light-shielding layer 430 is located above parts area of the scan line SL, parts area of the first data line DL1, and parts area of the second data line DL2. The light-shielding layer 430 is disposed between two adjacent first pixel electrodes PE1 and two adjacent second pixel electrodes PE2. The light-shielding layer 430 is overlapped with one of the first pixel electrodes PE1 adjacent thereto. In an area between two adjacent second pixel electrodes PE2, a gap G2 is formed between the first data line DL1 and the second data line DL2. In addition, the gap G2 between the first data line DL1 and the second data line DL2 is covered by the light-shielding layer 430.

The gap (G1) between the first pixel electrode PE1 and the first data line DL1 (or second data line DL2) is approximately 0 micrometer to 5 micrometers. Preferably, the gap (G1) is about 3 micrometers. The gap (G2) between the first data line DL1 and the second data line DL2 is approximately 5 micrometer to 15 micrometers. Preferably, the gap (G2) is about 10 micrometers. Furthermore, in the area between two adjacent second pixel electrodes PE2, sum of the gap (G2), the line width W6 of the first data line DL1 and the line width W7 of the second data line DL2 is greater than the width W8 of the light-shielding layer 430. In other words, in the area between two adjacent second pixel electrodes PE2, the width W8 of the light-shielding layer 430 is greater than the gap (G2), but the width W8 of the light-shielding layer 430 is smaller than sum of the gap (G2), the line width W6 of the first data line DL1 and the line width W7 of the second data line DL2. Furthermore, in the area between two adjacent second pixel electrodes PE2, the gap (G2) is about 10 micrometers, the line width W6 of the first data line DL1 and the line width W7 of the second data line DL2 are both about 6 micrometers, and the width W8 of the light-shielding layer 430 is about 16 micrometers.

As mentioned above, in the area between two adjacent second pixel electrodes PE2, sum of the gap (G2), the line width W6 of the first data line DL1 and the line width W7 of the second data line DL2 is greater than the width W8 of the light-shielding layer 430; and in the area between two adjacent first pixel electrodes PE1, sum of the gap (G2), the line width W6 of the first data line DL1 and the line width W7 of the second data line DL2 is smaller than the width W9 of the light-shielding layer 430. For instance, in the area between two adjacent first pixel electrodes PE1, the width W9 of the light-shielding layer 430 is approximately 26 micrometers to 52 micrometers.

As shown in FIG. 9, the second pixel electrode PE2 and the first data lines DL1 adjacent thereto are overlapped with a first overlapping width (W1). In the present embodiment, the first overlapping width (W1) is approximately 0 micrometer to 10 micrometers, and preferably, the first overlapping width (W1) is about 8 micrometers. The light-shielding layer 430 and the first pixel electrodes PE1 adjacent thereto are overlapped with a second overlapping width (W2). The second overlapping width (W2) is approximately 0 micrometer to 6 micrometers, and preferably, the second overlapping width (W2) is about 5 micrometers. Furthermore, the light-shielding layer 430 and the second pixel electrodes PE2 adjacent thereto are overlapped with a third overlapping width (W3). The third overlapping width (W3) is approximately 0 micrometer to 15 micrometers, and preferably, the third overlapping width (W3) is about 4 micrometers. The gap (G1) is defined to be the distance between the edge of the first pixel electrode PE1 (i.e. the first pixel electrode PE1 located at the right side) and the edge of the first data line DL1. The gap (G1) is approximately 2 micrometers to 6 micrometers. Additionally, the distance between the edge of the first pixel electrode PE1 (i.e. the first pixel electrode PE1 located at the right side) and the edge of the second data line DL2 is approximately 10 micrometers to 25 micrometers.

In the present embodiment, the light-shielding layer 430 is fabricated over the color filter layer CF and is not in contact with the color filter CF directly, as shown in FIG. 9. Specifically, the light-shielding layer 430 is located between the second substrate 240 and the display medium 250.

Figure 10:
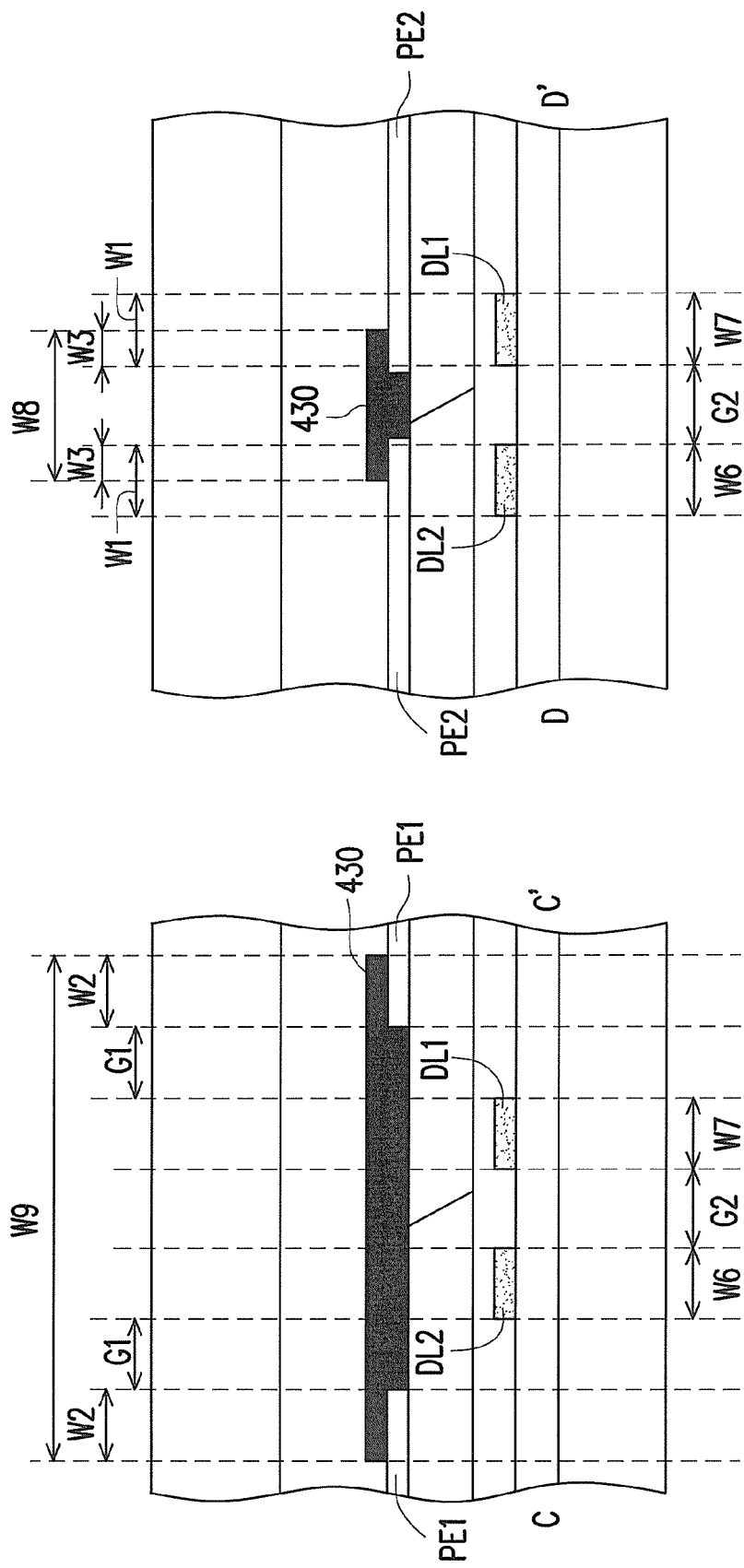
FIG. 10 is another cross-sectional view along line C-C' and line D-D' in FIG. 8.

FIG. 10 is another cross-sectional view along line C-C' and line D-D' in FIG. 8. The light-shielding layer 430 shown in FIG. 10 is fabricated on and directly in contact with the color filter layer CF and is not in contact with the color filter CF directly (so-called Black matrix On Array design). Specifically, the light-shielding layer 430 is located between the first substrate 210 and the display medium 250.

In the area between two adjacent second pixel electrodes PE2, since the width W8 of the light-shielding layer 430 is smaller than sum of the gap (G2), the line width W6 of the first data line DL1 and the line width W7 of the second data line DL2, light leakage resulted from the black matrix 430 is improved. Accordingly, display quality of the sub-display unit S is enhanced.

Since light leakage may occurred at edge of the sub-display unit can be avoided by the design of the black matrix of the present application, the display panel of the present application has favorable display quality.

What is claimed is:

1. A display panel, comprising:
   a first substrate;
   a plurality of scan lines and a plurality of data lines disposed on the first substrate;
   a plurality of sub-pixel units disposed on the first substrate, each of the sub-pixel units comprising:
      a main display unit comprising a first switch and a first pixel electrode, the first pixel electrode and the data lines adjacent thereto being separated from each other with a gap (G1); and
      a sub-display unit comprising a second switch and a second pixel electrode, the second pixel electrode and the data lines adjacent thereto being overlapped with a first overlapping width (W1);
   a light-shielding layer disposed between two adjacent first pixel electrodes, the light-shielding layer and one of the first pixel electrodes adjacent thereto being overlapped with a second overlapping width (W2);
   a second substrate disposed opposite to the first substrate; and
   a display medium disposed between the first substrate and the second substrate.

2. The display panel of claim 1, wherein the first switch and the second switch in each of the sub-pixel units are electrically connected with the same scan line and the same data line.

3. The display panel of claim 2, wherein the light-shielding layer and the second pixel electrodes adjacent thereto are not overlapped.

4. The display panel of claim 2, wherein 0 micrometer<gap (G1)≦5 micrometers, 0 micrometer<first overlapping width (W1)≦5 micrometers, and 0 micrometer<second overlapping width (W2)≦6 micrometers.

5. The display panel of claim 2, wherein each of the data lines comprises:
   a first portion located between two adjacent first pixel electrodes and has a first line width; and
   a second portion located between two adjacent second pixel electrodes and has a second line width, the first line width being smaller than the second line width, and the first line width is approximately 4 micrometers to 10 micrometers, and the second line width is approximately 10 micrometers to 20 micrometers.

6. The display panel of claim 2, wherein the light-shielding layer is located between the first substrate and the display medium.

7. The display panel of claim 2, wherein the light-shielding layer is located between the second substrate and the display medium.

8. The display panel of claim 2, further comprising a color filter layer located between the first substrate and the display medium.

9. The display panel of claim 1, wherein the first switch and the second switch in each of the sub-pixel units are electrically connected with the same scan line and different data lines.

10. The display panel of claim 9, wherein the light-shielding layer and one of the second pixel electrodes adjacent thereto are overlapped with a third overlapping width (W3), 0 micrometer<gap (G1)≦5 micrometers, 0 micrometer<first overlapping width (W1)≦10 micrometers, 0 micrometer<second overlapping width (W2)≦6 micrometers, and 0 micrometer<third overlapping width (W3)≦15 micrometers.

11. The display panel of claim 9, wherein the light-shielding layer is located between the first substrate and the display medium.

12. The display panel of claim 9, wherein the light-shielding layer is located between the second substrate and the display medium.

13. The display panel of claim 9, further comprising a color filter layer located between the first substrate and the display medium.

14. A display panel, comprising:
   a plurality of sub-pixels, each of the sub-pixels being electrically connected with a scan line and a data line, and each of the sub-pixels comprising:
      a main display unit comprising a first switch and a first pixel electrode, the first switch being electrically connected with the scan line and the data line, the first pixel electrode being electrically connected with the first switch, and the first pixel electrode being not overlapped with the data line;
      a sub-display unit comprising a second switch and a second pixel electrode, the second switch being electrically connected with the scan line and the data line, the second pixel electrode being electrically connected with the second switch, and the second pixel electrode and the data line adjacent thereto being overlapped;
   a color filter layer covering the scan line, the data line, the first switch, and the second switch; and
   a light-shielding layer located above parts area of the scan line and parts area of the data line, the light-shielding layer being disposed between two adjacent first pixel electrodes and overlapped with one of the first pixel electrodes adjacent thereto, and the light-shielding layer being not disposed between two adjacent second pixel electrodes.

15. The display panel of claim 14, wherein a gap is between the first pixel electrode and the data line, and the gap is covered by the light-shielding layer, and a width of the gap is approximately 0 micrometer to 5 micrometers.

16. The display panel of claim 14, wherein a distance between an edge of the first pixel electrode and an edge of the data line is approximately 3 micrometers to 12 micrometers.

17. The display panel of claim 14, wherein a distance between an edge of the second pixel electrode and an edge of the data line is approximately 2 micrometers to 5 micrometers.

18. The display panel of claim 14, wherein the data line comprises:
   a first portion located between two adjacent first pixel electrodes and has a first line width; and
   a second portion located between two adjacent second pixel electrodes and has a second line width, the first line width being smaller than the second line width, wherein the first line width is approximately 4 micrometers to 10 micrometers, and the second line width is approximately 10 micrometers to 20 micrometers.

19. The display panel of claim 14, wherein the light-shielding layer is in contact with the color filter layer directly.

20. The display panel of claim 14, wherein the light-shielding layer is in contact with the color filter layer indirectly, and the color filter layer is disposed under the first pixel electrode and the second electrode.

21. A display panel, comprising:
   a plurality of sub-pixels, each of the sub-pixels being electrically connected with a scan line and a data line, and each of the sub-pixels comprising:
      a main display unit comprising a first switch and a first pixel electrode, the first switch being electrically connected with the scan line and the data line, the first pixel electrode being electrically connected with the first switch, and the first pixel electrode being not overlapped with the data line;
      a sub-display unit comprising a second switch and a second pixel electrode, the second switch being electrically connected with the scan line and the data line, the second pixel electrode being electrically connected with the second switch, and the second pixel electrode and the data line adjacent thereto being overlapped;
   a color filter layer disposed under the first pixel electrode and the second pixel electrode and covering the scan line, the data line, the first switch, and the second switch; and
   a light-shielding layer located above parts area of the scan line and parts area of the data line, the light-shielding layer being disposed between two adjacent first pixel electrodes and two adjacent second pixel electrodes, the light-shielding layer being overlapped with one of the first pixel electrodes adjacent thereto, and in an area between two adjacent second pixel electrodes, a width of the light-shielding layer being smaller than a line width of the data line.

22. The display panel of claim 21, wherein a gap is between the first pixel electrode and the data line, and the gap is covered by the light-shielding layer, and a width of the gap is approximately 0 micrometer to 5 micrometers.

23. The display panel of claim 21, wherein a distance between an edge of the first pixel electrode and an edge of the data line is approximately 3 micrometers to 12 micrometers, and a distance between an edge of the second pixel electrode and an edge of the data line is approximately 0 micrometer to 5 micrometers.

24. The display panel of claim 21, wherein the data line comprises:
   a first portion located between two adjacent first pixel electrodes and has a first line width; and
   a second portion located between two adjacent second pixel electrodes and has a second line width, the first line width being smaller than the second line width, wherein the first line width is approximately 4 micrometers to 10 micrometers, and the second line width is approximately 10 micrometers to 20 micrometers.

25. A display panel, comprising:
   a plurality of sub-pixels, each of the sub-pixels being electrically connected with a scan line, a firs data line, and a second data line, and each of the sub-pixels comprising:
      a main display unit comprising a first switch and a first pixel electrode, the first switch being electrically connected with the scan line and the first data line, the first pixel electrode being electrically connected with the first switch, and the first pixel electrode being not overlapped with the first data line and the second data line; and
      a sub-display unit comprising a second switch and a second pixel electrode, the second pixel electrode being electrically connected with the second switch, and the second pixel electrode being overlapped with the first data line and the second data line;
   a color filter layer disposed under the first pixel electrode and the second pixel electrode and covering the scan line, the first data line, the second data line, the first switch, and the second switch; and
   a light-shielding layer located above parts area of the scan line, parts area of the first data line, and parts area of the second data line, the light-shielding layer being disposed between two adjacent first pixel electrodes and two adjacent second pixel electrodes, the light-shielding layer being overlapped with one of the first pixel electrodes adjacent thereto, in an area between two adjacent second pixel electrodes, a gap being between the first data line and the second data line, and sum of the gap, a line width of the first data line and a line width of the second data line is greater than a width of the light-shielding layer.

26. The display panel of claim 25, wherein the second switch is electrically connected with the scan line and the second data line.

27. The display panel of claim 25, wherein the first data line comprises:
   a first portion located between two adjacent first pixel electrodes and has a first line width; and
   a second portion connected with the first portion, located between two adjacent second pixel electrodes and has a second line width;
   wherein the second data line comprises:
   a third portion located between two adjacent first pixel electrodes and has a third line width; and
   a fourth portion connected with the third portion, located between two adjacent second pixel electrodes and has a fourth line width.

28. A display panel, comprising:
   a plurality of sub-pixels, each of the sub-pixels being electrically connected with a scan line and a data line, and each of the sub-pixels comprising:
      a main display unit comprising a first switch and a first pixel electrode, the first switch being electrically connected with the scan line and the data line, and the first pixel electrode being electrically connected with the first switch; and
      a sub-display unit comprising a second switch and a second pixel electrode, the second switch being electrically connected with the scan line and the data line, and the second pixel electrode being electrically connected with the second switch; and
   a light-shielding layer substantially surrounding the main display unit, wherein the sub-display unit is not surrounded by the light-shielding layer.

* * * * *